(12) United States Patent
Lawrence et al.

(10) Patent No.: US 6,253,300 B1
(45) Date of Patent: Jun. 26, 2001

(54) COMPUTER PARTITION MANIPULATION DURING IMAGING

(75) Inventors: Andy V Lawrence; Robert S Raymond, both of Orem; Eric J Ruff, Springville, all of UT (US)

(73) Assignee: PowerQuest Corporation, Orem, UT (US)

( * ) Notice: Subject to any disclaimer, the term of this patent is extended or adjusted under 35 U.S.C. 154(b) by 0 days.

(21) Appl. No.: 09/134,883

(22) Filed: Aug. 15, 1998

Related U.S. Application Data

(60) Provisional application No. 60/056,616, filed on Aug. 20, 1997, and provisional application No. 60/087,452, filed on Jun. 1, 1998.

(51) Int. Cl.[7] .................................................. G06F 12/02
(52) U.S. Cl. ............................ 711/173; 711/112; 711/165
(58) Field of Search .................................... 711/112, 170, 711/171, 172, 173, 165

(56) References Cited

U.S. PATENT DOCUMENTS

| | | | |
|---|---|---|---|
| 5,438,671 | 8/1995 | Miles | 395/200 |
| 5,537,592 | 7/1996 | King et al. | 395/600 |
| 5,638,521 | 6/1997 | Buchala et al. | 395/311 |
| 5,659,614 | 8/1997 | Bailey, III | 380/4 |
| 5,675,769 | 10/1997 | Ruff et al. | 395/497.04 |
| 5,706,472 | 1/1998 | Ruff et al. | 395/497.04 |
| 5,758,165 | 5/1998 | Shuff | 395/712 |
| 5,829,045 | 10/1998 | Motoyama | 711/162 |
| 5,907,672 | 5/1999 | Matze et al. | 395/182.06 |

OTHER PUBLICATIONS

Norton Ghost™ Personal Edition User's Guide (entire guide), 1998–1999.
Norton Ghost Competitive Matrix, no later than Jun. 4, 1999.
RapiDeploy from Altiris lets you sleep tonight, no later than Jun. 3, 1999.
"RapiDeploy", PC Magazine, May 4, 1999.
"Performance Tests", PC Magazine, May 4, 1999.
"Drive Image 2.0", PC Magazine, May 4, 1999.
"ImageCast IC3", PC Magazine, May 4, 1999.
About Ghost, no later than Jul. 2, 1997.
Partition Resizer, no later than 1995.
Taking the tedium out of installs, Nov. 6, 1996.
"About Ghost —Detailed Information", Binary Research Limited, 1997, pp. 1–4.
"Ghost User Manual", Binary Research Limited, 1997, pp. 1–4.
Chad Magendanz, "Shrink Wrap™ 2.1", 1994–96, pp. 1–3.
"Verlustlos", 1995.
Japanese Patent Abstract, publication No. 04137126, published Dec. 5, 1992.
PCT Response, Sep. 21, 1999.
Norton Ghost for NetWare White Paper, pp. 1–12, Mar. 14, 1999.

*Primary Examiner*—Kevin L. Ellis
(74) *Attorney, Agent, or Firm*—Computer Law"

(57) ABSTRACT

Methods, systems, and articles of manufacture are provided for manipulating partitions while imaging them to another disk on the same or another computer. By integrating partition manipulations with imaging, the invention reduces data movement. Rather than resizing a source partition in place and then imaging the resized source partition, for instance, one embodiment of the invention leaves the source partition intact and performs resizing on-the-fly by manipulating a memory-resident copy of the source partition's file system structures and then copying the modified structures and corresponding portions of the source user data to the target location. In addition to partition resizing, on-the-fly manipulations possible with the invention include cluster resizing, defragmentation, file relocation, and others. Novel image file formats suitable for on-the-fly manipulations are also described.

41 Claims, 5 Drawing Sheets

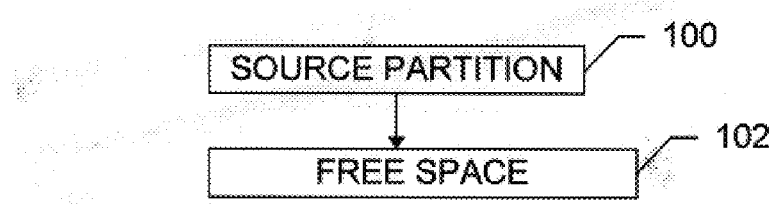
FIG. 1
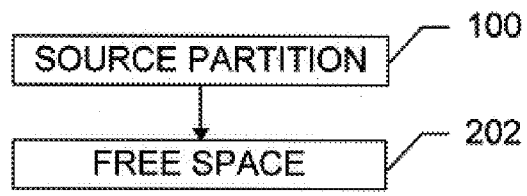
FIG. 2
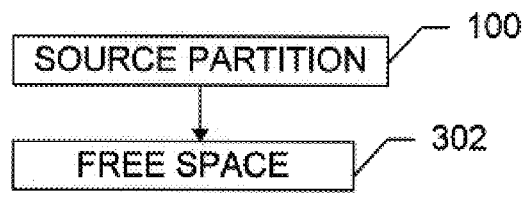
FIG. 3
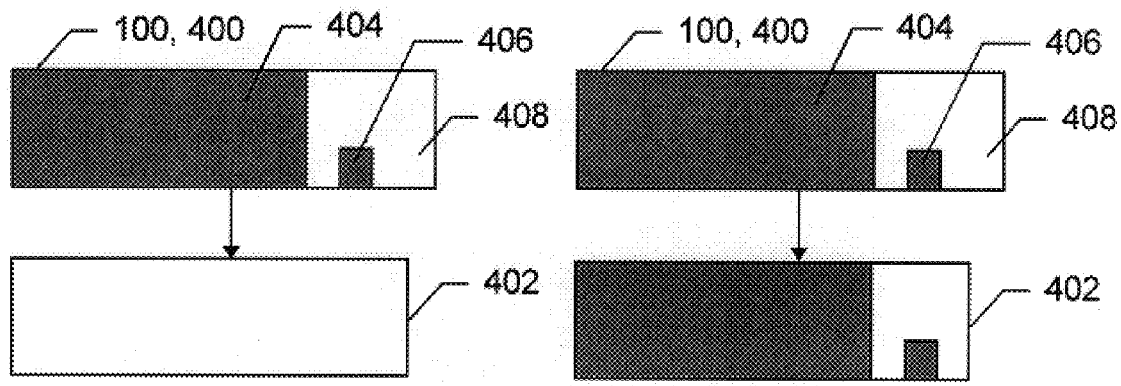
FIG. 4                    FIG. 5

COMPUTER PARTITION MANIPULATION DURING IMAGING

RELATED APPLICATIONS

The present application claims priority to the following commonly owned copending U.S. patent applications: Ser. No. 60/056,616 filed Aug. 20, 1997; Ser. No. 60/087,452 filed Jun. 1, 1998.

FIELD OF THE INVENTION

The present invention relates to on-the-fly manipulation of computer storage device partitions, and more particularly to changing the sector count and/or cluster size of a partition while otherwise replicating the partition.

TECHNICAL BACKGROUND OF THE INVENTION

Some Terminology

Computer hard disks and other computer storage devices hold digital data which represents numbers, names, dates, texts, pictures, sounds, and other information used by businesses, individuals, government agencies, and others. To help organize the data, and for technical reasons, many computers divide the data into drives, partitions, directories, and files. The terms "file" and "directory" are familiar to most computer users, and most people agree on their meaning even though the details of written definitions vary.

However, the terms "partition" and "drive" have different meanings even when the context is limited to computers. According to some definitions, a partition is necessarily limited to one storage device but a "file system" may include one or more partitions on one or more disks. Many partitions reside on a single disk, but some use volume sets, stripe sets, mirror sets, or other approaches to store a single partition's data on more than one disk.

As used here, a "partition" is a region on one or more storage devices which is (or can be) formatted to contain one or more files or directories. A partition may be empty. A partition may also be in active use even without any directories, file allocation tables, bitmaps, or similar file system structures if it holds a stream or block of raw data. Each formatted partition is tailored to a particular type of file system, such as the Macintosh file system, SunOS file system, Windows NT File System ("NTFS"), NetWare file system, or one of the MS-DOS/FAT file systems (MACINTOSH is a trademark of Apple Computer, Inc.; SUNOS is a trademark of Sun Microsystems, Inc.; WINDOWS NT and MS-DOS are trademarks of Microsoft Corporation; NETWARE is a trademark of Novell, Inc.). Partition manipulation may include manipulation of file system data within the partition. A file system need not fill the partition which holds it, either in the sense that all sectors within the partition are used by the file system or in the sense that all sectors within the partition are recognized by the file system as being present.

"Drive" is sometimes used interchangeably with "partition," especially in references to logical drive C: or another logical drive holding the operating system on so-called Wintel machines. But "drive" may also refer to a single physical storage device such as a magnetic hard disk or a CD-ROM drive. To reduce confusion, "drive" will normally be used here to refer only to storage devices, not to partitions. Thus, it is accurate to note that a partition often resides on a single drive but may also span drives, and a drive may hold one or more partitions.

Partition Manipulation Generally

It is often useful to manipulate partitions by creating them, deleting them, moving them, copying them, changing their size, changing the cluster size used by their file systems, and performing other operations. A number of tools for manipulating partitions are commercially available, including the FDISK program and the PartitionMagic® program (PARTITIONMAGIC is a registered trademark of PowerQuest Corporation). Partition manipulation is discussed in detail in U.S. Pat. Nos. 5,675,769 and 5,706,472, incorporated herein, and in other references.

Disk Imaging Generally; A First Imaging Method

It is also useful to copy partitions in groups to create archive copies or to configure additional storage devices. For instance, backup programs have long been available to copy every file in a partition, every file in a group of partitions, or every sector (used or not) on a disk to another storage device such as a secondary disk or tape drive on the same computer or a connected computer such as a file server.

Various programs have become available for copying or "imaging" a group of partitions stored on a source disk drive. Imaging programs in general allow multiple partitions to be copied. The first, and simplest, imaging method ("Method A") used is a "file-by-file" approach that creates a copy of every single file that is found in one or more source partition(s). The copy can be stored to temporary storage as an "image file," or the intermediate storage step can easily be dispensed with so the imaging is performed directly to create another disk image (on one or more hard drives, simultaneously or sequentially).

If the copy is to be stored in an image file, it can optionally be compressed prior to storage, and then decompressed at the appropriate stage while creating a new disk image. Compression operates on the data being stored to reduce redundancy by run-length encoding, for instance. An image file may pack clusters, compress data, or both. An image file, unlike a partition, stores data in a form not recognized by conventional file system software. For instance, user data clusters may be packed, so the cluster numbers or other pointers in the file system structures in an image file do not necessarily point to the current (packed) location of the data clusters in question; the clusters are unpacked and restored to their expected relative locations when data from the image file is copied to a target disk to create a partition there. "Target" and "destination" are used interchangeably herein.

When a new image is to be created, the partition size(s) of the destination partition(s) is determined and the destination partition(s) is quickly formatted for the appropriate file system and at the chosen size. Then, each file is copied, one at a time, to the new image. All directory and other system updates occur as each file is copied. At the option of the implementer of this method, any type of disk caching scheme can (and should) be used to group disk updates to reduce disk-head movement, which in turn will reduce the time required to complete the operation.

Even with caching, however, file-by-file copying often requires significant disk head movement for at least two reasons. First, in many cases the disk head must move from one contiguous group of sectors to the next contiguous group as it reads a given file. This head movement can be minimized for multiple reads of a given file by defragmenting the file, but defragmentation itself generally requires head movement and data movement. Second, in many cases the disk head moves each time a new file is opened for reading, since the end of one file is often not contiguous with the start of the next file. In addition, file-by-file copy programs often make the disk head(s) jump back and forth between a directory containing information such as the file names and a user data area which holds file contents.

Accordingly, some disk imaging programs do not copy user data file-by-file, but instead copy data cluster-by-cluster or sector-by-sector. All clusters or sectors are copied in some cases, and only used clusters or sectors are copied in others. As explained further below, although cluster-by-cluster and sector-by-sector approaches often require less head movement than file-by-file approaches, imaging and partition manipulation (such as partition resizing or cluster resizing) are separate, sequential and often time-consuming steps in conventional systems.

Partition Manipulation with a Second Disk Imaging Method

A second method ("Method B") of disk imaging, which is somewhat harder to implement than Method A, takes a sector-by-sector approach. One version of Method B copies all used sectors of the source hard-disk partition(s). The copy can be stored to temporary storage in the form of an image file stored on one or more disks, or the intermediate storage step can be dispensed with so the imaging is performed directly to create another disk image on one or more hard drives, simultaneously or sequentially.

To reduce the amount of data transferred, it is possible to use a version of Method B which copies fewer sectors. This is implemented by only copying used sectors when possible. In some instances it is not possible to easily prevent copying of some unused sectors; although such non-essential sectors have no data that needs to be preserved, they are in such close proximity to data-containing sectors that it is easier and/or faster to copy them than it is to avoid copying them.

In any event, either a bit map, a used-sector list, a file-allocation table, or a similar structure must also be stored in order to determine where each copied sector belongs, relative to the start of the partition, when creating a new image; the sectors are packed in the image file instead of being at the same relative locations as they are within the source partition. In some cases (such as NTFS bitmaps), the appropriate information is already inherent in the file-system structures themselves, and no additional tables or lists or maps need be created or stored.

When a new image is to be created, the partition size(s) of the destination partition(s) is determined. Rather than formatting the new image on the destination, as in Method A, the source sectors are copied to their relative locations on the destination partition. Where needed, any stored tables, lists, or maps that show where the sectors should be placed, relative to the start of the partition, may be consulted.

If the destination partition is identical in size to the source, and the hard-disk geometry of the destination drive is also identical to that of the source, then the operation will be complete after the new image has been created and all required system and data sectors have been copied. Otherwise, a separate (sometimes complex) partition-resizing step is needed to resize (either shrink or expand) the partition to the required size and to ensure that it properly conforms to standard partition-sizing conventions familiar in the art, such as alignment with cylinder boundaries.

Comparison of Method A with Method B

The major benefit of Method B, over Method A, is that the disk-head movement during the imaging process on the destination disk is reduced, in most cases being reduced to only one smooth, continuous "elevator" seek as the data is written to the disk. If the destination partition needs no resizing, this method will almost always be faster than Method A, where there can be two or three times as many head seeks as there are files copied. For instance, for each file written with file-by-file Method A there could be a seek to the location to write the data, another seek to the directory to update it, and another seek to the file-allocation table or bitmap to update it. Note that proper disk caching can substantially reduce this time, but it cannot eliminate the head-seek overhead entirely.

Assuming an imaging process for a partition containing 500 MB of data spread among 5,000 files, and a hard disk with a seek time of 10 ms and a data-throughput rate of 4 MB per second (and ignoring all time to create a copy of a source image and the time required to retrieve that source from storage), Method A will require 125 seconds to write the data to the new image, plus up to 150 seconds more for disk-seek time (5,000 files X 3 seeks per file X 0.01 seconds), or up to 275 seconds. Method B would require only 125 seconds total, plus a few seconds to account for track-to-track seek time.

However, there are at least two major deficiencies of Method B. First, it requires copying all system and data sectors. Copying partial sectors complicates the method, and so is not done (although copying partial sectors can be implemented, the complexity rarely yields savings enough to justify the effort). Since only whole sectors are copied (and in simplified models, sometimes whole clusters, or groups of sectors, are copied, whether entirely used or not), it is almost certain that extra data will be copied, resulting in more data needing to be transferred than with Method A. This can add to the imagewriting time, and will almost certainly result in a larger size every time for storage when an image file is used.

Another major disadvantage is that, with Method B, in many cases some partition resizing will be needed. Resizing can be quick. But in some cases resizing involves major restructuring and adjustment of critical system structures, requiring substantial time to perform numerous disk-head seeks and non-contiguous reads and writes. In the worst case, Method B with resizing can require several times as much time as Method A. The present invention cures this defect by eliminating the need to first create and then resize the destination partition.

Disk Imaging and Partition Manipulation Generally

Known imaging programs using Method B significantly limit the flexibility and efficiency of changes in partition size. Many imaging programs using either Method A or Method B can only create a target partition which is the same size (same number of sectors or other allocation units) as the source partition. Some imaging programs will change partition size, but only in very limited ways. For instance, some programs will add additional sectors, thereby making the target partition larger than the source partition, so that the target partition edge lies on a disk cylinder boundary when it would not do so without the additional sectors. These approaches have limited value when the target storage medium is much larger than the source storage medium because they do not make the newly available space on the target available to the file system within the partition.

One approach to making larger partitions involves using a relatively fast disk imaging program to create a target partition that is substantially the same size as the source partition and then using the PartitionMagic program or similar tool to make the target partition substantially larger. Alternatively, the source partition can be resized before imaging (if room is available and the source is not read-only) and then the substantially larger source partition can be copied straight across by the imaging tool.

Another kind of imaging program can create an empty target partition which is substantially larger than the source partition. "Substantially larger" means not increased merely to the next cylinder boundary but increased even farther by putting the target partition edge beyond that cylinder boundary. "Substantially smaller" has a similar meaning that hinges on cylinder boundaries or other nearby bounds imposed by file system or operating system requirements. The user data is then copied, file-by-file, from the source partition to the substantially larger target partition. This makes a separate resize after imaging unnecessary, but it also has disadvantages.

First, care is not always taken to match cluster size, FAT table size and format, and other file-system-specific characteristics dependent on partition size with the increased partition size. Some programs thus create a nonstandard partition, with the partition table indicating a large partition and the internal file system structures within the partition assuming, in some or all respects, a smaller partition. Such inconsistencies can be inconvenient at best. In the worst case, inconsistent indications about file system state may place user data at risk of corruption or loss because the expected location of the data and the actual location differ.

Second, a file-by-file approach to copying user data generally requires significant disk head movement. Repeated movements are needed to go back to the directory or FAT table or other file system structures to locate each file in turn. Repeated movements are also often needed to read file contents because files are typically fragmented. That is, each file is typically stored in several locations which are separated by regions of the storage medium that do not hold the file's contents. Fragmentation can be alleviated, or perhaps even eliminated, by running a defragmentation program on the files before copying them.

However, the need to revisit the directory for each file remains even if every file is defragmented (stored in one contiguous region of the storage medium). Even if each file is contiguous, files are not necessarily accessed in the same order in which they appear as one scans the partition from one edge to the other. In a sense, the partition itself is fragmented because files are scattered about relative to other files in the partition. Many of these considerations still apply when data is copied from one partition to another by way of an intermediate image file.

In short, the following tools are presently available:
file defragmentation tools;
relatively fast sector-by-sector disk imaging tools which do not allow substantial changes in partition size;
significantly slower file-by-file disk imaging tools which allow the target partition size to be substantially different than the source partition size; and
tools for resizing partitions or clusters in place, either before or after imaging.

Accordingly, it would be an improvement to provide new systems, devices, and methods for manipulating partitions during imaging, both for improved ease of use and to make desired operations faster and more flexible. Such improvements are disclosed and claimed below.

BRIEF SUMMARY OF THE INVENTION

The present invention provides novel methods, systems, and devices for imaging hard-disk partitions. As an example, consider a source disk having two partitions, S1 and S2, which are to be modified and imaged to a target disk T. Assume a user wants to remove certain files from S1 to make room for increased space in S2 on the target, and also wants to make file accesses more efficient by defragmenting S1. For instance, the user may wish to remove outdated archive copies, temporary files, and files pertaining to a shelved project, in order to make room for several new application programs. In a conventional system, this might be done by a sequence of operations summarized as follows:

(S1→delete→S1'→defrag→S1"→shrink→S1'"; S2'→expand→S2')→image→T

That is, the user deletes the selected files from S1 to create S1' on the source disk, defragments S1' to create S1", uses a partition resizer program such as PartitionMagic® to shrink S1" to form S1'", uses the partition resizer to expand S2 to form S2', and finally copies S1.'" and S2' to the target disk. This approach has serious drawbacks, including the complexity perceived by the user and the requirement that source partitions be changed. Another drawback is the possibility that additional operations might be needed on T. For instance, T may be larger than S, so the image of S2' on T should be expanded even further than was possible on S.

Moreover, a given block of data may be moved (on disk or between disk and memory) several times. For instance, the delete routine, defragger, and partition resizer may each make their own copy of directory information. Likewise, the defragger and the partition resizer may move some of the same data blocks around on disk.

By contrast, the present invention allows an approach such as the following:

(S1, S2)→ delete S1 files, defrag S1, shrink S1, expand S2, image→T That is, the file deletion, defragmentation, and partition resizing are performed on-the-fly with the imaging. This has several advantages. The entire set of operations can be presented to the user as a single operation, possibly by way of a "wizard" or other simplifying interface. The source partition need not be changed. S2 can be expanded to the full extent allowed, regardless of whether the source disk is smaller than the target. Finally, duplicative data movements are often avoided, although significant head movement may still occur in some cases while gathering source files to defragment.

In one embodiment, an implementation of the invention first finds the boundaries of the available free space. Then it obtains a bitmap of all used source sectors, and possibly also a bitmap of all sectors used to hold file system structures in the source. The total size of the used source sectors is calculated and compared to the size of the free space. Options such as file deletion and cluster resizing are investigated as needed. File system structures may be read into memory to speed their manipulation.

Assuming sufficient space is available, the imaging begins by copying straight across all used source sectors that can be so copied without falling outside the target partition. Other sectors are then tucked into the free space. Finally, the file system structures are updated. This may be done in memory before laying them down, or it may be done by reading them from the target, adjusting them, and writing them again. The partition table is also either laid down for the first time, or read, modified, and rewritten, to reflect any differences in partition size or disk geometry between the source and target.

The invention may be used when all partitions on a drive or selected partitions of a source drive are imaged. New disk images may be created from either a stored image file, or directly from the source hard drive, at speeds that can be substantially faster than those provided by prior approaches.

A major weakness of the Method B discussed in the Technical Background is that method's dependency on resizing the partition after the data is copied, which can in the worst case substantially increase the total time required for imaging and partition resizing. With the present invention, a "virtual resize" of the partition to be copied removes this deficiency. System and directory sectors are updated in memory before being written to disk.

Toward this end, some embodiments make a complete copy of all directory and system sectors and locations. This can be done either during the source-reading process, allowing the information to be stored with the partition copy; or it can be done on-the-fly each time a stored partition is copied, by traversing the system and directory information that is inherent with the stored sectors. The preferred method is to store this file system structure information at the time the source sectors are first read and copied to storage. This allows immediate access to the information each time a new partition image is to be created on the destination drive, and since the nature of disk imaging allows for many images created from one source, a time-consuming step is removed for each new image created.

Since the size of both the original source partition and the destination partition is known, it can be determined, prior to copying data and system sectors, exactly where each data and system sector must be placed in the new image being created on the destination drive. A translation map may be created to be consulted during the imaging process, allowing quick determination of the proper "virtually resized" location for each group of sectors. The translation map shows the original and final (after virtual resizing or other on-the-fly manipulation) location of each data sector, or at least the final location of each relocated sector. The translation map may be tailored to the characteristics and requirements of the file system used in the partition, such as being placed in FAT format, NTFS format, or another file system structure format.

In short, the invention makes disk imaging more flexible and more efficient by locating and organizing file system structures in memory and in image files specifically for access by an imaging program which includes integrated partition manipulation code for resizing and other on-the-fly operations. It also allows imaging from read-only source partitions into targets that would otherwise be too small. Other features and advantages of the present invention will become more fully apparent through the following description

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings:

FIG. 1 is a diagram showing the relative sizes of a source partition and a free space region; the free space is to receive a target partition containing both the user data in the source and corresponding file system structures.

FIG. 2 is a diagram similar to that of FIG. 1, showing the case in which the source partition and the free space are substantially the same size.

FIG. 3 is a diagram similar to the preceding two Figures, in which the source partition is substantially larger than the available free space.

FIG. 4 is a diagram further illustrating one situation of the kind shown in FIG. 3, with particular attention now paid to the allocation of used space and free space by the file system within the source partition.

FIG. 5 is a diagram showing the result after the used space of FIG. 4 is copied straight across to the free space to create a target partition.

DETAILED DESCRIPTION OF THE PREFERRED EMBODIMENTS

Figures 6, 8:
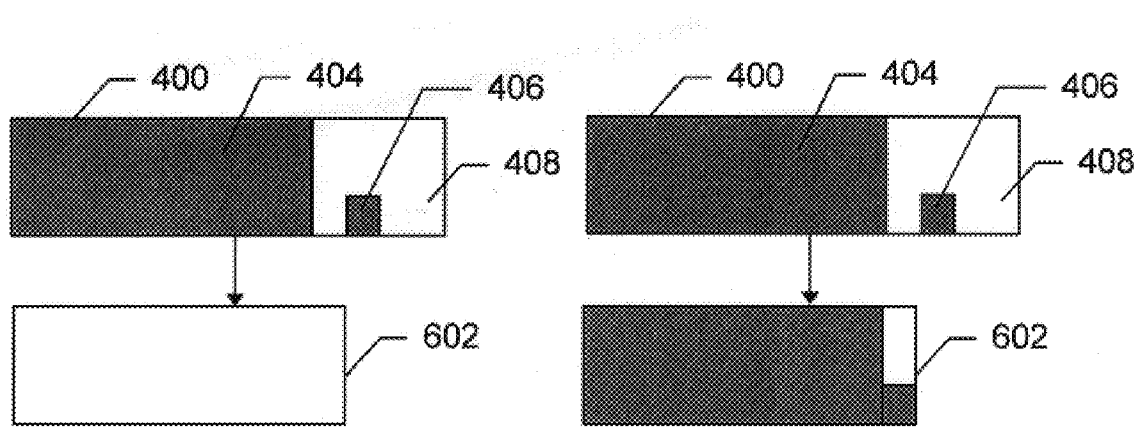
FIG. 6 is a diagram illustrating a situation of the kind shown in FIG. 3 but different from that shown in FIG. 4, in that used space cannot be copied straight across without being lost because it would lie outside the free space and thus outside the target partition.
FIG. 8 is a diagram illustrating an inventive approach to the situation in FIG. 6, which involves on-the-fly partition packing and resizing while imaging, thereby creating a target partition within the available free space without losing user data while also avoiding unnecessary data movement and leaving the source partition intact.
Figure 7:
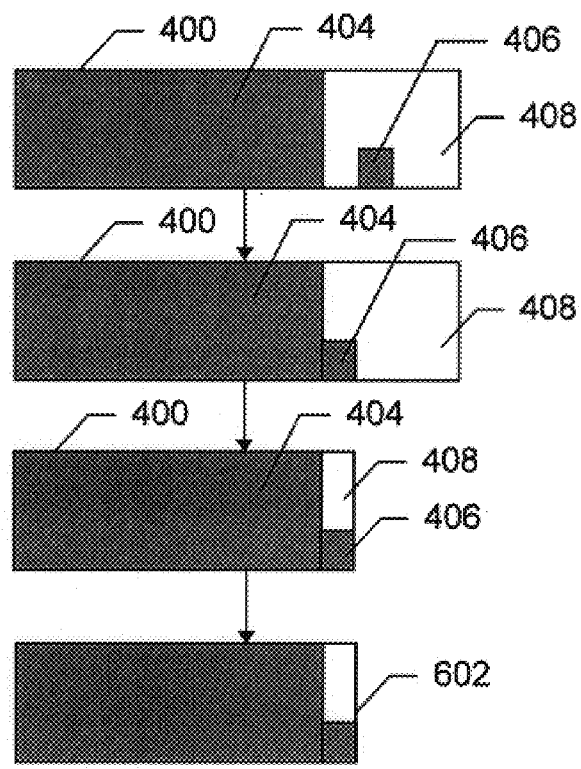
FIG. 7 is a diagram illustrating a conventional approach to the situation in FIG. 6, which involves defragmenting or otherwise packing the source partition, resizing the source partition in place, and then imaging the now-smaller source partition straight across into the free space to create a target partition within the available free space without losing user data.

The present invention relates to "on-the-fly" partition manipulation performed in conjunction with disk imaging. Partition manipulation and data replication systems and methods are discussed in general, and with attention to FAT, NTFS, and HPFS file systems specifically, in U.S. Pat. Nos. 5,675,769 and 5,706,472 and in U.S. patent application Ser. No. 08/834,004; those discussions are incorporated herein by reference. Relevant terms are defined there and elsewhere herein; in the event of a conflict, unincorporated portions of the present application prevail.

Some Terminology

Users sometimes need to copy partitions from one location to another. A user may be a person, or it may be a software task or agent or other computer process acting legitimately on behalf of a person. The two locations may be on the same disk, on different disks attached to the same computer, or on different disks attached to two different computers. In the latter case, the two computers involved may communicate through a network or other communications link, including a dial-up link, a portable link such as an infrared link or other "wire" as defined below, and/or intermediate files of various formats. The network may be connectable to other networks, including LANs or WANs or portions of the Internet or an intranet, through a gateway or similar mechanism.

A network may include one or more servers that are connected by network signal lines to one or more network clients. The servers and clients may be uniprocessor, multiprocessor, or clustered processor machines. The servers and clients each include an addressable storage medium such as random access memory and/or a non-volatile storage medium such as a magnetic or optical disk, ROM, bubble or flash memory.

Suitable network clients include, without limitation, personal computers; laptops, pagers, cell phones, personal digital assistants, and other mobile devices; and workstations. The signal lines may include twisted pair, coaxial, or optical fiber cables, telephone lines, satellites, microwave relays, modulated AC power lines, RF connections, and/or other data transmission "wires" known to those of skill in the art.

The servers and many of the network clients are often capable of using floppy drives, tape drives, optical drives or other means to read a storage medium. A suitable storage medium includes a magnetic, optical, or other computer-readable storage device having a specific physical configuration. Suitable storage devices include floppy disks, hard disks, tape, CD-ROMs, PROMs, random access memory, ROM, flash memory, and other computer system storage devices. Some of these devices have cylinder boundaries, while others do not. Devices that lack cylinder boundaries may nonetheless emulate such boundaries for compatibility reasons.

The physical configuration represents data and/or instructions which cause the computer system to operate in a specific and predefined manner as described herein. Thus, the medium tangibly embodies a program, data, functions, and/or instructions that are executable by the servers and/or network client computers to support partition manipulation during imaging substantially as described herein. Suitable software and hardware implementations according to the invention are readily provided by those of skill in the art using the teachings presented here and programming languages and tools such as Java, Pascal, C++, C, assembly, firmware, microcode, PROMS, and/or other languages, circuits, or tools.

Partition Imaging and Manipulation Situations Generally

FIGS. 1 through 3 illustrate generally three situations that may occur when a user wishes to copy a source partition 100 from a source location to a destination location. In the first situation, a region of free space 102 available at the destination to receive a copy of the source partition 100 is larger than the source partition 100, as shown in FIG. 1. In the second situation, a region of free space 202 is the same size as the source partition 100, as shown in FIG. 2. As shown in FIG. 3, in the third situation a region of free space 302 is smaller than the source partition 100. In general the source and destination may be on the same drive, on different drives on the same computer, or on different drives on different computers.

As discussed below, each of FIGS. 1 through 3 actually represents more than one specific situation, depending on how used space is distributed within the source partition 100, on what file system is used in the source partition 100, and other factors. However, it is useful to initially categorize the possible situations into the three groups illustrated by these three Figures.

In many situations like those shown in FIG. 1, the user need only create a new partition that is the same size as the source partition 100. Such a new partition can be created by "directly copying" used sectors from the source partition straight across to the free space. If the free space needs to be visible to an operating system as a partition, then the partition table is also updated.

Under "direct copying" (also referred to as copying "straight across"), a sector of user data located at offset N in the source partition 100 is copied to the sector located at the same offset N in the free space 102. Accordingly, if one scans the source partition 100 and the new partition in the (formerly free) space 102 after direct copying, then all used sectors appear in the same order in each partition, with all of the same gaps (same offset, same run length) between used sectors. Such a direct copying capability is provided by the PartitionMagic® and DriveCopy programs from Power-Quest Corporation of Orem, Utah (PARTITIONMAGIC is a registered mark, and DRIVECOPY is a mark, of Power-Quest Corporation).

A variation on direct copying identifies bad sectors in the free space 102 and then relocates any used sectors in the source partition 100 before directly copying the source partition 100. This prevents the implementing software from trying to copy used sectors onto bad sectors. Bad sectors can be identified by reading file system structures (FAT tables mark bad cluster numbers, other file systems use other forms of list) and/or by performing a surface test (read every sector or write-read-verify every sector).

However, in some situations like those shown in FIG. 1, it would be helpful to create a new partition which is larger than the source partition 100. For instance, if the source partition 100 is on a one-Gigabyte disk drive and the free space 102 is on a four-Gigabyte disk drive, it may be helpful to make the new partition three or four times as large as the source partition 100 so that additional free space is available to accommodate later growth in the amount of user data within the new partition. One way to do this is to use direct copying to create a new partition the same size as the source partition 100 and then use the PartitionMagic program to resize the new partition in place so it includes the additional free space.

The present invention provides an alternative, which resizes the new partition "on-the-fly" without modifying the source partition, so that the new partition created in the free space 102 already contains the additional free space upon creation. Thus, no subsequent resizing is required to make the new partition substantially larger than the source partition 100. Such on-the-fly partition growth is generally easier than on-the-fly partition shrinkage, although similar in many respects; much of the present discussion is therefore directed to shrinking partitions on-the-fly.

Considering situations like those shown in FIG. 2, it appears at first glance that the new partition must be the same size as the source partition 100, making direct copying the only relevant step. However, it may be possible to create a new partition which is smaller than the source partition 100. For instance, if there are enough unused sectors in the source partition 100, the user could use a conventional file defragmentation tool (sometimes called a "defragmenter" or "defragger") to close the gaps between used sectors for each file, and then use the PartitionMagic program to resize the source partition 100 so it is smaller than before. The PartitionMagic program will also compact the partition by packing clusters, that is, by closing gaps between used sectors which do not necessarily belong to the same file. However, both defragmentation and other forms of cluster packing conventionally involve modifying the source partition in place to prepare for subsequent imaging.

Those of skill in the art will appreciate that defragmentation and cluster packing are related but not identical processes. Defragmentation is a specific type of cluster packing, in which at least some clusters within a given file are packed together in ascending sequence to make contiguous runs. Cluster packing in general pertains to a partition as a whole rather than a single file, and merely packs clusters into free space to allow partition shrinkage. Files are not necessarily defragmented by packing in general, and such packing may even increase file fragmentation.

If the partition boundary must fall on a cylinder boundary, then there must be at least one cylinder's worth of unused sectors before defragmentation or compaction will allow partition shrinkage. Cluster resizing may also create free space. If the defragmented and/or compacted source partition 100 has been shrunk, then direct copying will create a new partition which is smaller than the original source partition 100.

The present invention provides an alternative, which defragments and/or compacts and also resizes the new partition "on-the-fly" so that the new partition created in the free space 102 is already substantially smaller than the source partition upon creation. From the user's point of view, a single partition imaging step replaces generally separate defragmenting, compacting, resizing, and direct copying steps.

In addition to partition resizing (larger or smaller), defragmentation, and compaction, other partition or file system operations can also be performed on-the-fly during imaging according to the present invention. Such operations include, among others, removal of unwanted data, data compression and decompression, data encryption and decryption, file system integrity checks such as those performed with the CHKDSK tool, relocating sectors to avoid bad sectors on the target, and conversion from one file system to another. Performing partition operations on-the-fly while imaging can be substantially more efficient than performing separate steps because data movement, disk head movement, unnecessary user interaction, and other time-consuming steps can be greatly reduced.

Turning now to situations like those shown in FIG. 3, it appears at first glance that the new partition cannot be created in the available space 302 because that space 302 is smaller than the source partition 100. As noted above, however, it may be possible to create a new partition which is smaller than the source partition 100. A conventional approach involves using a file manager or similar operating system tool to delete files identified by the user, using a stand-alone defragmenter to defragment the source partition 100, using the PartitionMagic program to resize the source partition 100 smaller, and then directly copying the source partition 100 (assuming it is now small enough) into the free space 302. As indicated above, the present invention provides an alternative in which file deletion, file defragmentation, partition shrinkage, and partition copying are replaced (both from the user's perspective and in terms of reduced disk accesses) by a single enhanced imaging step.

Some of the concepts and methods noted above are further illustrated in FIGS. 4 through 8. Although situations like those of FIG. 3 are shown in FIGS. 4 through 8, those of skill in the art will appreciate that the present invention also applies to situations like those shown in FIGS. 1 and 2.

FIG. 4 shows a source partition 400 which is larger than a free space 402. The source partition 400 is one example of the source partitions 100 discussed above, in which used sectors are arranged as shown. In particular, the source partition 400 contains a first region 404 of contiguous used sectors and second region 406 of contiguous used sectors. The second region 406 of used sectors is separated from the first region 404 and from the end of the partition 400 by unused sectors 408. It will become apparent that either region 404, 406 could contain gaps rather than being fully contiguous, that additional regions of used sectors could be present, or that one or the other of the regions 404, 406 could be missing in other partitions 400. More generally, the various partition and free space examples given are provided for illustration only and do not exclude many other situations in which the present invention is capable of operating.

As shown in FIG. 5, the partition 400 and the free space 402 are configured internally and sized relative to each other such that direct copying from the source partition 400 could create a new partition. Although defragmentation, compaction, or file deletion are possible, they are not required to create the new partition.

By contrast, assume the free space available to receive the source partition 400 is not the free space 402 but is instead the smaller free space 602 shown in FIG. 6. As noted above and illustrated in FIG. 7, the partition 400 could be defragmented in a conventional manner, making the region 406 contiguous with the region 404, and the partition 400 could then be resized using familiar tools, after which a direct copy is made in the free space 602 using known imaging techniques. As shown in FIG. 8, however, the on-the-fly optimized imaging of the present invention creates a small packed and possibly also defragmented new partition in a step that (a) appears to the user as a single integrated resizing and imaging step, (b) is more efficient than conventional approaches, and (c) does not require changes to the source partition.

Resizing On-the-Fly Methods in General

Figure 9:
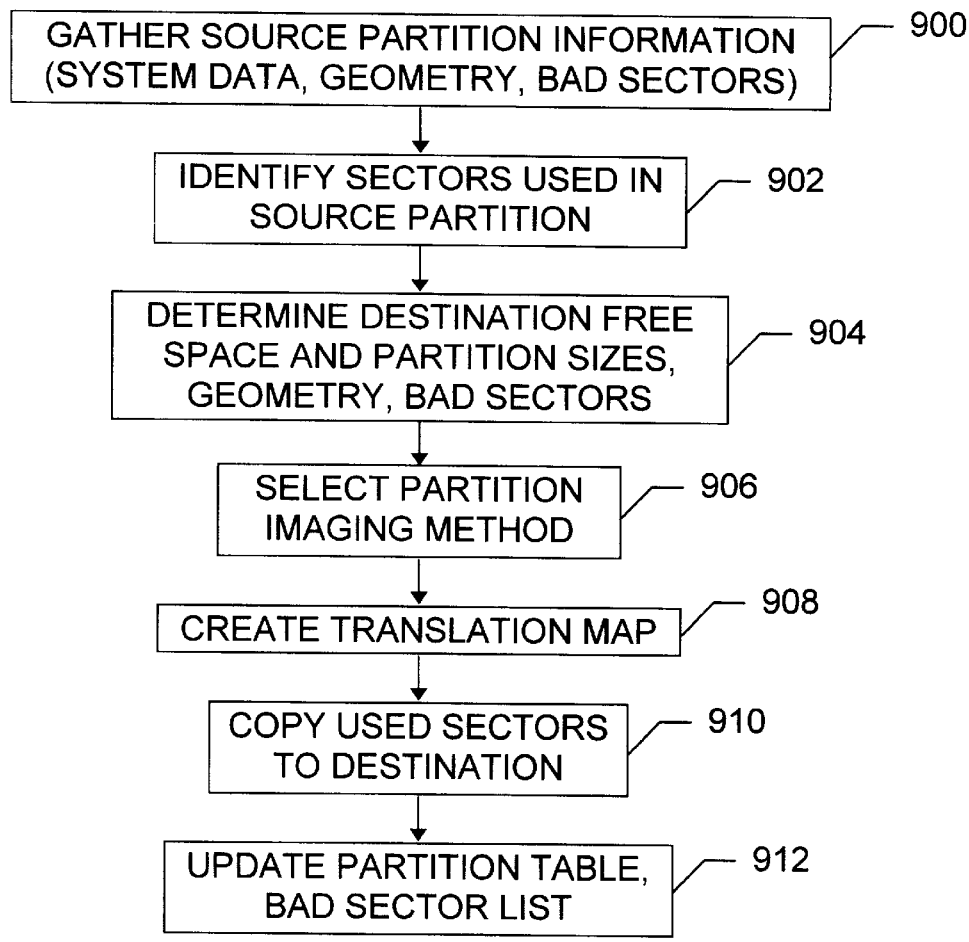
FIG. 9 is a flowchart illustrating generally methods of the present invention.

FIG. 9 illustrates generally the enhanced imaging methods of the present invention. During a gathering step 900, software implementing the invention gathers information about the source partition and its context. This information typically falls into three categories: system information, disk geometry, and a bad sector list.

The system information includes operating system information such as the partition table contents, an indication whether the source partition is bootable, an indication whether the source partition is hidden, a copy of a verified master boot record ("MBR"), and a lock or other guarantee of exclusive access to the source partition and the partition table. The system information also includes file system information such as the type of file system being used in the source partition (FAT12, FAT16, FAT32, NTFS, HPFS, Linux, and many other file systems are examples), and a copy of the information in the file allocation table, bitmap, or other "allocation map" indicating which sectors or clusters are being used.

The disk geometry specifies the sector size in bytes, number of sectors per track, number of heads (tracks per cylinder), and number of cylinders. If striping or mirroring or another fault tolerant approach is being used, multiple disks may be specified. The geometry may be retrieved by a system call. If a storage device other than a disk, such as RAM, ROM, or flash memory is being used, the geometry so specifies and indicates the page or other block size and the number of blocks and their addressing characteristics. Battery-backed RAM, ROM, or flash memory may be configured as "disks." Seek time is then much less of a concern, but such disks are otherwise interchangeable with optical or magnetic disks for purposes of partition manipulation and imaging according to the present invention.

The bad sector list identifies bad sectors in the source partition; bad sectors are those which are known or suspected of being unable to reliably hold data. The bad sector "list" may be a linked list, a bitmap, a collection of FAT table entries, or another data structure identifying bad sectors. It may be obtained with the file system structures, or by a call to the operating system or the storage device controller. It may also be omitted, if the medium provides acceptable reliability without operating system or file system assistance. This may be the case, for instance, with disks interfaced through disk controllers that identify attempts to access bad sectors and remap them internally to good sectors without notifying the system call that attempted the access.

During an identifying step 902, the sectors being used in the source partition are identified. In many situations, including those illustrated in FIGS. 4 through 8 and others, space on a storage medium is allocated to a partition but is not currently in use by the file system within the partition. In such situations, the implementing software uses file system data structures to determine which sectors within the partition are being used to hold user data or system data, and which are not being used.

File systems use bitmaps, file allocation tables, and other "allocation map" data structures to keep track of which sectors are in use by which files and which sectors are free. The free sectors may be identified explicitly in a list or table, or they may be identified implicitly by virtue of being within the partition bounds but not shown as used in the allocation map.

Allocation maps may track used sectors on a sector-by-sector basis when the file system allocates file space one sector at a time, but many file systems use file system allocation units that are contiguous blocks or clusters of multiple sectors. The number of bytes per cluster (or sometimes the number of 512-byte sectors per cluster) is the "cluster size." As used herein, "cluster" denotes a file allocation unit generally, and hence is not limited to FAT or NTFS file systems.

In some file systems, such as NTFS, all allocation (except the boot sector and backup boot sector which are always allocated) is done in clusters of equal size. In other file systems, such as FAT12 and FAT16, a large system area is reserved, storage for user data is allocated in aligned clusters, and the system area boundary is cluster-aligned but structures within the system area (such as a potentially large number of empty file allocation table entries) are not cluster-aligned. In the latter case, an allocation map of sector granularity rather than cluster granularity may be used by the invention, at least for system sectors.

In general, file allocation tables in FAT file systems, bitmaps in NTFS, and other file system structures are sufficiently well documented by their vendors to allow one of skill in the art to determine which sectors are in use by which files by examining a copy of the system structures. Accordingly, the identifying step 902 determines which file system is present in the source partition, locates the file system structures, reads them, and identifies which sectors are in use in the source partition. It is not necessary to tie particular sectors to particular files unless the user is being given the option of deleting files on-the-fly, that is, the option of not copying one or more files to the new partition.

During a determining step 904, the size of the available free space at the destination is determined. Free space at the destination may be presently available space, potentially available space, or a combination of the two. Presently available free space is contiguous space, of sufficient size to hold the new partition, which is not yet allocated to any partition. Potentially available free space is space that is outside partitions but not contiguous, or space within a partition that is not being used by the partition's file system. Partition movement or resizing is needed to make potentially available space into presently available space; resizing may involve defragmentation or compaction before the partition boundary is moved.

In one implementation, the determining step 904 divides the disk or other storage medium into regions; a list of regions is stored in the implementing software solely for that software's internal use. Region boundaries are defined at the edges of existing partitions and at the physical edges of the disk or other medium. Each region is labeled with its associated free space size and an indication of whether the region is allocated to a partition. The amount of free space in a region that is not yet allocated to any partition is the size of the entire region. The amount of free space in a region that is allocated to a partition is the amount of space unused by the file system, subject to any limits on the minimum size of the partition. The regions can be sorted into order, with the largest presently available space first, other presently available spaces next in decreasing size, followed by the largest potentially available free space and the other potentially available free space regions in decreasing order.

The determining step 904 also determines the geometry of the destination, using techniques similar to those used to discover the geometry of the source partition, namely, querying the controller hardware or operating system, checking system configuration files, and (as an absolute last resort because it decreases ease of use) asking the user. If the geometry of the destination differs from that of the source, it is possible to use logical sector addresses rather than physical (cylinder, track, sector) addresses during sector copy operations. Different geometry may require the removal or addition of trailing free space so that the new partition ends on a cylinder boundary and otherwise satisfies operating system constraints, such as the limit to 1024 cylinders imposed on some FAT partitions.

The determining step 904 also determines which sectors in a selected and/or potential free space region are bad. This may be done by querying the hardware, or by checking a list built from file system structures and maintained even when the partitions containing the file systems are moved or deleted. It may also be done by testing each sector with a write operation, or a write followed by a verifying read operation. These latter approaches should be optional in most cases because they can be quite time-consuming. Alternatively, if the medium is sufficiently reliable then bad sector tests can be omitted.

During a selecting step 906, the implementing software and/or the user select a partition imaging method. This selection involves several decisions: which free space region(s) will be the destination; what combination, if any, of file deletion, file defragmentation, partition movement, and partition resizing will be used to fit the new partition in a space which is smaller or larger than the source partition; what combination, if any, of compression, encryption, or other user data transformation will be employed on-the-fly; what other system data manipulation will be performed on-the-fly; and what integrity checks will be performed.

During a creating step 908, a translation map is created to guide the process of using data from the source partition to create the new partition. In the case of direct copying, the translation map need not list every mapping, since the sector at offset N in the source partition always goes to the sector at the same offset N in the new partition.

In the case of a partition which is defragmented or otherwise packed on-the-fly, such as the partition 400 in FIG. 8 and others, the bounds of the destination free space are superimposed on a copy of the bounds of the source partition. Source partition sectors that lie within the superimposed destination are directly copied. Source partition sectors that would lie outside the destination free space if directly copied are mapped to unused sectors that lie at offsets within the destination. The translation also remaps sectors that would otherwise be mapped to a bad sector.

During a sector copying step 910, sectors are copied from the source partition to the free space to form the new partition. All sectors containing user data are copied, unless the user specified that certain files should be omitted, in which case the sectors for those files are not copied. All system data sectors are copied unless an on-the-fly manipulation is being done that changes the system data. For instance, on-the-fly cluster resizing changes cluster numbers in a FAT file allocation table; and file system conversion changes system structures from one file system format to another. In such cases, the file system structures resulting from the manipulation are computed by the implementing software and put in the new partition in place of the corresponding file system structures of the source partition.

During an updating step 912, the partition table is updated to show the new partition, as well as any changes made on-the-fly, including resizing, deletion, or other manipulations to make room for the new partition. Partition table formats are familiar, and illustrative partition table updates are performed by the PartitionMagic program and other commercially available tools. Any known bad sectors are also entered in the bad sector list or other file system structure used in the new partition to track bad sectors.

Some Examples of On-the-Fly Shrinking

One embodiment of the invention allows limited partition shrinking during imaging as follows. As usual, a partition is considered to have a left edge and a right edge (some tools represent these in the user interface as top and bottom edges or vice versa), with the left edge having a lower address (e.g., logical sector number) than the right edge. The implementation of the invention determines the file system type being used in the source partition and then identifies the rightmost boundary of the rightmost file system structure, such as a FAT table, an NTFS Master File Table, or other file system structure. If the available space for the target partition is smaller than the distance from the left edge of the source partition to that rightmost file system structure boundary, then the user is informed that the partition cannot be shrunk to fit and imaging is not performed. That is, no attempt is made to relocate file system structures. This approach reduces the complexity of the implementation while still providing some shrink-to-fit capability.

A more complex implementation relocates file system structures as needed, and refuses to attempt imaging in the situation of FIG. 3 only when the space that is currently used by the file system (system data and user data) in the source partition will not fit within the target free space. In some file systems, such as NTFS, the file system structures are located in system files, so relocating them involves relocating system files. A variation on this approach informs the user when the target free space is too small, even with system structure relocation, and gives the user the option of identifying files to be omitted from imaging (on-the-fly deletion of selected files).

Another implementation determines whether the target free space will be large enough if clusters are resized. That is, there are infrequent but identifiable situations in which the available space will not hold all used clusters but will hold all used sectors and a cluster resize is compatible with the intended target partition size (file system software usually expects or accepts only certain cluster sizes for a given partition size). This implementation performs on-the-fly cluster resizing, if that is the only way to fit the data in the available free space.

Some Comments Regarding Bitmaps and "Elevator Seeks"

One important advantage of the present invention over file-by-file imaging tools is the reduction in disk head movement and consequent speed increase. One approach of the invention begins by obtaining a bitmap or other allocation map of used sectors. The allocation map allows a comparison of the available free space size with the total size of the used sectors, to determine whether operations such as resizing while imaging, deleting while imaging, and/or cluster resizing while imaging are needed. The allocation map also identifies the sectors that must be copied (sectors used by the file system) and those that may be copied for efficiency or convenience reasons but need not be copied to preserve user data (unused sectors).

An allocation map, such as an NTFS bitmap, represents the allocation status of a partition at least by indicating which clusters have been allocated for use. An allocation map may also indicate whether the use is by the file system or by the user. A FAT file allocation table, and a runmap specifying the starting position and length of runs of allocated clusters, are two other examples of allocation maps.

Code that provides the allocation map for use according to the invention is file-system-dependent. For instance, the NTFS file system includes a bitmap which need merely be passed to the inventive implementation, while a bitmap must be built (in a straightforward manner) for FAT file systems from the FAT file allocation table.

If the situation is like that shown in FIG. 4 or even that shown in FIG. 6, then in many cases no system structures need be relocated. The implementation then makes one pass through the source partition, reading used sectors and copying them to an intermediate file or to the target partition. If the used sectors are going to an intermediate file, they are packed together. If they are going to a target free space on another disk, they are copied straight across to the same offset as in the source partition. Sector-by-sector copying goes much more quickly than file-by-file copying because the disk heads need not jump around to revisit the directory or to move between file fragments or from the end of one file to the start of the next file some distance away. Instead, the heads do so-called "elevator seeks." A "pass" through a disk (or other storage medium) is a left-to-right (or right-to-left) sequence of one or more accesses, or a sequence of accesses performed in order by ascending (or descending) sector addresses (except for controller remapping to avoid bad sectors).

One implementation also speeds up imaging by doing continuous reads even if some of the data read is not needed; this reduces the time spent waiting for disk rotation to bring the desired data under (or over) the disk head. The bitmap or other allocation map is searched to identify "runs" of contiguous used sectors. A first buffer receives the first read of data from the disk. This first buffer may hold unused sectors as well as used sectors, if unused sectors lie between runs and both the runs and their intervening unused sectors will fit within the buffer. Then the used sectors only are copied to a second buffer, which is written to the packed intermediate file. In many cases it is faster to read unused intervening sectors so that two (or more) runs can be read continuously instead of reading the first run, waiting for the disk rotation, reading the next run, and so forth. Likewise, if the target is another disk and the copying is straight across to another partition rather than an intermediate file, then it may be faster to write unused data from the first buffer (no second buffer is needed) rather than only writing used sectors. Of course, unused sectors between the last run in the prior filling of the buffer and the next run, which will be put at the beginning of the buffer in the current filling, need not be read or written.

If the situation is like that shown in FIG. 6, then the implementation makes one pass through the source partition and two passes through the target partition. Direct copying is done until the pass through the source reaches the offset at which a direct copy would place a used sector outside the target partition. This marks the end of the first pass through the target partition. The remaining used sectors in the source are then copied, during a second partial pass through the target, to free space between used sectors in the target. This is the situation illustrated in FIG. 8. The partial second pass need not traverse the entire target partition. Instead, in one implementation it starts at the leftmost free space and ends when the last relocated used sector (such as sectors in block 406) is tucked into free space in the target. Additional head movement is then needed to update the FAT or other file system structures with the different offsets of such relocated sectors. However, this still requires significantly less head movement in most cases than file-by-file copying.

Another implementation obtains two allocation maps from the file-system-dependent code. One allocation map identifies used sectors, as above. The second allocation map identifies system data sectors, as opposed to user data sectors. System data sectors (also termed "system sectors") are sectors allocated to file system data such as FAT file allocation tables, NTFS Master File Tables, HPFS bitmaps, boot sectors in various file systems, and so forth. User data sectors are those allocated to hold the operating system and its files, application programs and their data, graphic images, and other data not required by the file system. According to an alternative, the first allocation map identifies clusters allocated to user data and the second map identifies file system clusters. Allocation maps may also indicate bad clusters, free clusters, and/or clusters outside the file system but nonetheless within the partition.

Regardless, during a first pass through the source partition, the used system sectors are stored in memory instead of being copied directly to the target. The file system structures in memory are then adjusted as necessary to reflect used data sector relocation, cluster resizing, defragmentation, or other on-the-fly operations.

If the file system is organized like a FAT file system, with system structures in a contiguous group at a known location, then reading the system structures into memory requires very little head movement, and the modified file system structures and the user data can be laid down on the target medium in very few passes. If the file system structures are scattered about, then some head movement may be needed to identify them and build the system structure allocation map, but once their locations are known they can be read into memory in one pass through the source partition. They can then be modified in memory as needed to reflect the partition manipulation(s) being performed during imaging.

A second pass reads the user data sectors from the source partition. Depending on the available memory, the file system being used, and the partition manipulation being performed on-the-fly, one or two passes through the target will often lay down all the modified system structures and the user data. For instance, if all system structures are simultaneously memory-resident and the partition manipulation is an instance of cluster size reduction or partition size change which does not change the relative order of any user data clusters, then the modified system structures and the user data can be laid down in a single pass, even if the relative location of some data is changed.

By contrast, suppose cluster size is being increased on-the-fly and sector movement is necessary such that the relative order of the data sectors changes. In that case, more passes through the target may be needed. Note, however, that some relative order movement can be done on-the-fly by manipulating contents of the read buffer that receives the user data from the source.

If all user files are stored in the image file in a defragmented state, and if no user files will be resequenced relative to other user files (although some files may be deleted), then the modified system structures and the user data can be laid down in a single pass, whether the cluster size is changed or not.

One implementation makes three passes through the target: one to lay down those user data sectors that can be copied straight across, a second partial pass to lay down the relocated user data sectors that are tucked into free space, and a third to lay down the modified file system structures which reflect sector relocation and other operations. Even if three passes through the target are needed, using on-the-fly manipulation according to the invention is often faster and/or more flexible than prior approaches.

Image Files

Resizing on-the-fly may be done when copying from source to target in a manner that creates file-system-recognized partitions immediately on the target, but it may also be performed when an intermediate file ("image file") is created. An image file may be archived and never used, except as insurance making it possible to readily recover the computer system's state ("system recovery") in the event of a catastrophic system failure. Alternatively, an image file may be used to configure new systems. In the case of system recovery using the image file, the source disk and the target disk are sometimes the same, and an intermediate file is normally required. In the case of routine system initialization and configuration, the targets may be disks in systems being upgraded or they may be disks in new or refurbished systems being initially prepared for use by an Original Equipment Manufacturer, Value Added Reseller, system consultant, IS department personnel, or similar entity.

Figure 10:
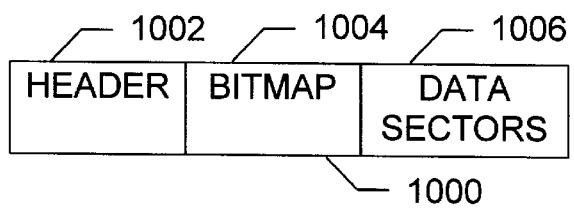
FIG. 10 is a diagram illustrating an image file format which has been used previously but is also suitable for use with the novel methods and systems of the present invention.
Figure 11:
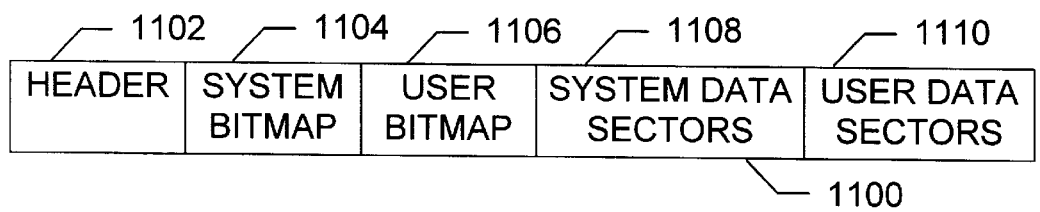
FIG. 11 is a diagram illustrating a novel image file format.

FIGS. 10 and 11 illustrate image file formats suitable for use according to the present invention. FIG. 10 shows an image file 1000 containing a header 1002, a bitmap 1004, and a collection of zero or more data sectors 1006. The header 1002 contains partition information such as the partition size, cluster size, and file system type; this information allows an embodiment of the invention to create or update the partition table on the target disk. The header 1002 may also contain timestamps, user names, and other information regarding the creation or modification of the image file 1000 itself. Finally, the header 1002 may contain encryption keys, tokens, or other access control information used to restrict access to the contents of the image file 1000.

The bitmap 1004 may be a bitmap, runmap, list, or other allocation map. It indicates which sectors of the source partition are used; this is necessary to restore the data sectors 1006 to their correct relative positions when copying them to the target. The bitmap 1004 shown does not distinguish between system and user sectors, and the two types of sectors may be interleaved in the data portion 1006, depending on their placement in the source partition. Image files 1000 in the format shown in FIG. 10 have been used commercially, but to the inventors' knowledge have not been used previously in conjunction with the virtual resizing and other on-the-fly manipulations described and claimed here.

By contrast, the image file 1100 format shown in FIG. 11 is new in that it does distinguish between user and system sectors (or clusters) to facilitate on-the-fly resizing. The header 1102 may contain the same information as the header 1002, with a flag or version number or other indication that two bitmaps are present rather than one; this may be indicated instead by an image file naming convention.

The two bitmaps or other allocation maps are preferably located in the order shown in FIG. 11, so a system bitmap 1104 showing which sectors or clusters are allocated to file system structures precedes a user bitmap 1106 showing the rest of the used sectors or clusters. Likewise, a copy 1108 of file system data preferably precedes a copy 1110 of the user data. This ordering aids manipulation of the system structures on-the-fly, particularly when the image file 1100 is stored on linear media such as magnetic tape or on quasi-linear media such as an ordered sequence of removable disks.

Selective Restore From An Image File

Figure 12:
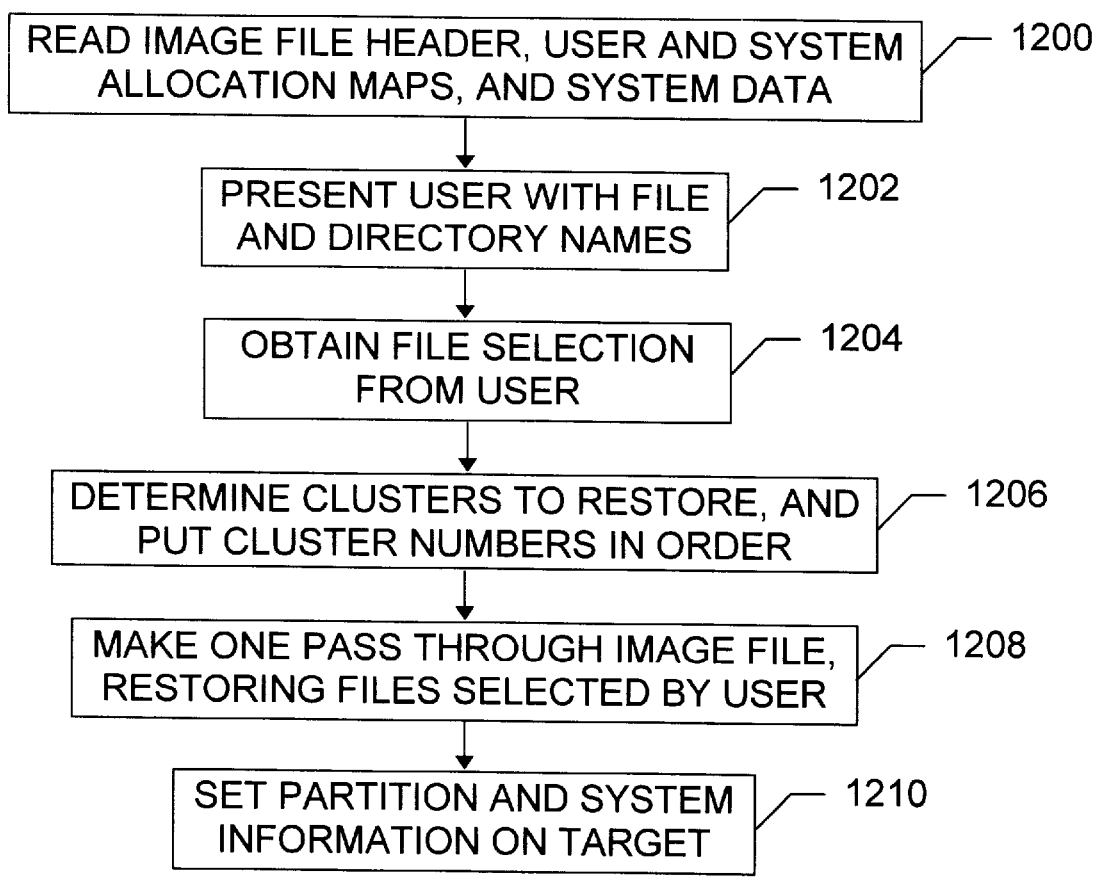
FIG. 12 is a flowchart illustrating a method of the present invention for imaging selected files

One beneficial use of the double allocation map format shown in FIG. 11 is image editing to specify which files in a partition should be restored or copied from an image file 1100. One method proceeds as shown in FIG. 12.

During a system information reading step 1200, image editor software reads the header 1102, system bitmap 1104, user bitmap 1106, and system data 1108 into memory. This provides sufficient information to present the user with a list of files during a presenting step 1202, using a graphical user interface or other familiar interface. The system data which is manipulated on-the-fly in memory may be a bitwise copy of all of the system data from the disk partition, or it may be a bitwise copy of selected system data from the disk partition if not all data is needed.

Alternately, the system data in memory may not be a bitwise copy but may instead be in a form that is different from the structures on disk, containing the same or a subset of the same information but having that information organized in structures that are not recognized by conventional file system software. One suitable alternate form, which orders clusters to help locate a given cluster quickly, is described in a commonly owned copending U.S. patent application Ser. No. 60/094,327, filed Jul. 27, 1998, incorporated herein by reference.

During an obtaining step 1204, the software obtains from the user a list or other specification of which file(s) to restore; this may be done by having the user specify the files expressly, or by having the user specify which files should not be restored. The specification may be obtained in terms of individual files, or in terms of directories or directory subtrees. The obtaining step 1204 may include executing code that supports keyword searches, wildcards in file names, and other familiar file system interface techniques.

During a determining step 1206, reference is made to the file system structures in memory to determine which clusters or sectors need to be restored from the image file 1100. The file system structures being referenced may be read into memory from disk, in a manner familiar to those of skill in the art of file system drivers, or they may be read in an analogous manner from (typically contiguous) sectors in the image file 1100. The cluster or sector numbers to be restored are sorted into order. A restoration bitmap may be created, with a bit on if and only if the cluster at that relative location in the user data 1110 should be copied to the target disk.

During a user data restoring step 1208, the clusters belonging to the selected files are copied from the image file 1100 to the target disk. Only one pass need be made through the image file data 1110, because the necessary clusters have been identified and ordered during the previous steps, and the user data sectors are stored in order in the image file 1100. This is especially beneficial if the image file 1100 is stored on several removable media, since it eliminates the need for users to put in one removable disk, then put in a second removable disk, then put the first removable disk back in, and so forth.

Finally, the corresponding partition and file system information is stored on the target during a step 1210. The file system information will be a subset of the information 1108 in the image file 1100, reflecting the fact that not all files or directories have been copied. The partition information may be the same as the partition information stored in the header 1102. Alternatively, the partition may be resized on-the-fly, either to decrease its size to reflect the presence of fewer files, or to increase its size in response to available free space on the target that would otherwise not be immediately usable by the file system in the target partition. Regardless, the necessary information is in the image file 1100, and is preferably also in memory as a result of step 1200.

In one embodiment, the source partition file system structures are read both from an image file 1100 or other source that is physically distinct from the target, and from the target before laying down the partition on the target. Information from the source file system structures is merged into the target structures rather than simply overwriting the target's previous contents. Likewise, user data can be merged into an existing partition rather than being laid down in an entirely new partition on the target. This on-the-fly merge of user and/or system data from two locations allows embodiments of the invention to support operations such as selective file restoration from an image file which is being used as a backup. Suitable merge techniques for merging individual files into an existing file system may draw on techniques used in conventional file system drivers.

Other Manipulations While Restoring From An Image File

Figure 13:
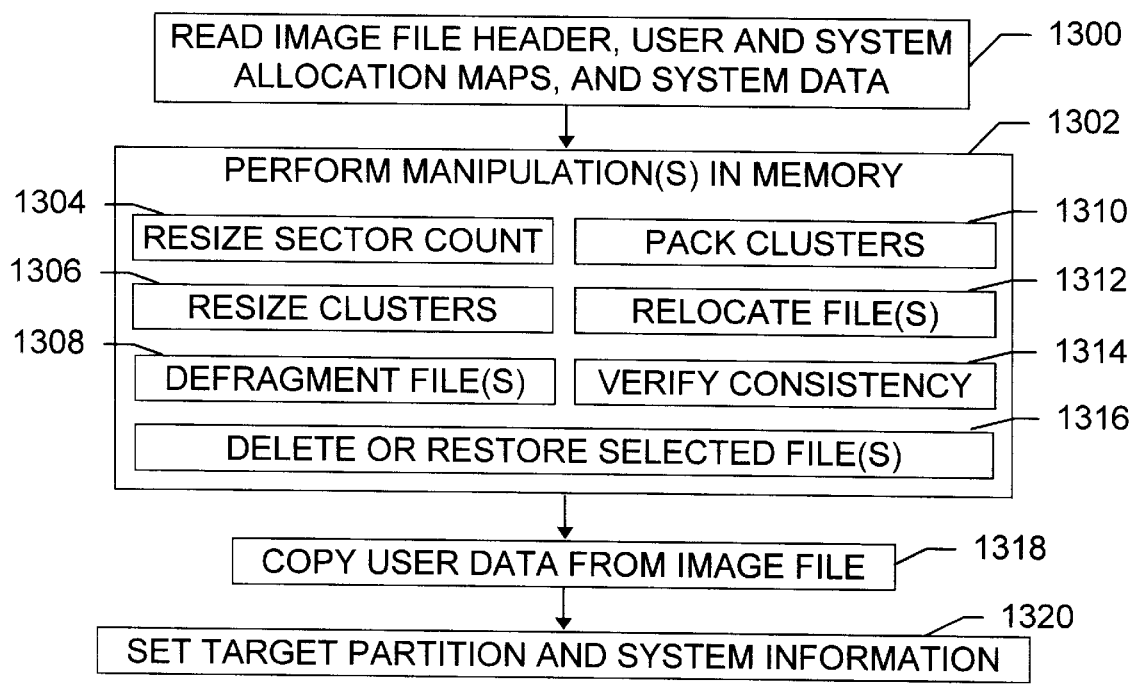
FIG. 13 is a flowchart illustrating methods of the present invention for manipulating partitions using data from an image file.

Other beneficial uses of the double allocation map format shown in FIG. 11 are also possible, as illustrated in FIG. 13. During a system information reading step 1300 similar to or identical with the step 1200, a system embodying the invention reads the header 1102, system bitmap 1104, user bitmap 1106, and system data 1108 into computer memory (RAM).

During a performing step 1302, the software performs one or more on-the-fly manipulations, in memory, of the system information for selected files. The entire partition or some subset of its files may be selected for manipulation. Suitable manipulation steps comprise a partition-resizing step 1304 which changes the sector count (or cluster count), thereby changing the size of the file system within the selected partition; a partition-resizing step 1306 which changes the cluster size; a file defragmenting step 1308; a cluster-packing step 1310; a file relocating step 1312 which relocates at least one sector in a file or relocates a system sector such as the backup boot sector; a consistency—and integrity—verifying step 1314, and a selective file deleting or restoring step 1316.

Each of these steps 1304 through 1316 is individually known in the art, at least in some form. For instance, the PowerQuest PartitionMagic® program performs partition resizing which changes the sector count and/or changes cluster size, and also performs cluster packing. However, these operations are not done in the context of imaging a disk. Instead, the PartitionMagic® program operates on one partition at a time. File defragmentation programs and file system conversion programs are also well known in the art. ChkDsk, ScanDisk, the PartitionMagic(® program, and other familiar tools perform consistency and integrity checks appropriate for the verifying step 1314. However, note that according to the invention the verifying step 1314 and other steps may be performed using a memory-resident copy of the system structures. File deletion and file copying or restoration are done in various ways by conventional systems and methods. File relocation occurs, for instance, when an HPFS partition is resized and the central directory band is moved to the new center of the larger or smaller partition.

However, previously known embodiments of these operations do not assume that the pertinent file structures are either already memory-resident or packed into an image file 1100. Moreover, prior approaches use these steps as separate sequential steps which are independent of disk imaging rather than making them part of on-the-fly manipulation while imaging. The steps 1304 through 1316 are closely integrated with disk imaging in the present invention, both in the sense that the user sees imaging and the other steps as a single operation, and in the sense that the integrated steps require less data movement than prior approaches.

During a user data restoring step 1318, the clusters belonging to the selected files are copied from the image file 1100 to the target disk. Only one pass need be made through the image file data 1110, because the necessary clusters have been identified and ordered during the previous steps. Finally, the corresponding partition and manipulated file system information is stored on the target during a step 1320.

Additional Implementation Tips

Several other points are worth mentioning with regard to various implementations of the invention:

The bitmap of used sectors, and the bitmap of system sectors (if the system bitmap is present), may be stored for convenience near the front of the image file. The offset of the last (rightmost) used sector, and the offset of the last file system structure sector, may also be stored near the front of the image file.

If it is expected that the image file will be used to create many copies of the target partition, then partition manipulations are best performed once, during the source-to-image-file phase, rather than being performed many times during instances of the imagefile-to-target phase.

Used sectors may be packed in the image file, so they are not necessarily at the offsets indicated in the file system structures. They are then unpacked when copied to the target(s).

Disk geometry constraints can be ignored or worked around in the image file. An image file need not end on a cylinder boundary. An image file may span several disks, as when it is stored on removable media such as a Zip disk (ZIP is a mark of Iomega Corp.).

A tradeoff can be made when balancing transfer speed against the need for smooth progress updates in a user interface. Larger buffers generally give faster transfer rates but may also give rise to less frequent notices to users if users are only notified that progress is occurring when a buffer fills, when an in-memory manipulation completes, or at other milestones during on-the-fly manipulations.

Partitions should be locked or exclusive access otherwise gained during on-the-fly manipulations to prevent data corruption or loss.

When adjusting file systems, semantic constraints observed by the PartitionMagic program and other tools should generally also be observed by on-the-fly manipulation tools. For instance, FAT file cluster boundaries should be respected.

Transfer rates can be monitored by keeping a count of sectors, bytes, clusters, or other units copied, in conjunction with calls to the system clock.

After a target partition is created, it may be necessary to reboot to have the new partition receive a valid drive letter under DOS and Windows operating systems. Other file system or operating system peculiarities, such as the HPFS "dirty flag," and the Windows NT drive letter assignment status, should be observed.

Some Comments on Alternative Embodiments

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, RAM, and other media readable by one or more of the computers. Each such medium tangibly embodies a program, functions, and/or instructions that are executable by the machines to perform substantially as described herein.

For ease of illustration, method steps are shown in the Figures even if they may be omitted from some claimed methods. In practice, steps may be omitted unless called for in the relevant claim(s), regardless of whether the steps are expressly described as optional in this Detailed Description.

Likewise, the steps are shown in a particular order even though they may be performed in other orders or concurrently, except when one step requires the result of another step. For instance, information about the source and destination may generally be obtained in the order shown, in the opposite order, or in an overlapping (concurrent) manner. Likewise, steps 1304 through 1316 may be performed in various orders and combinations.

Steps may also be repeated, even though the repetition is not shown expressly. For instance, multiple copies may be made by repeating the copying step 910, and the verifying step 1314 may be performed before or after some or each of the other steps shown in the Figures.

In addition, those of skill in the art will recognize when descriptions provided in connection with one step also pertain to another step, thereby making explicit repetition of the description unnecessary. For instance, bad sectors pertain to zero or more of steps 900, 904, 912, 1306, 1308, 1310, 1312, and 1318 in various claimed methods.

Steps may also be named differently. Finally, observations analogous to those above for method steps apply to the elements of system or storage medium claims.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods. Unless otherwise stated, any list of included items is exemplary, not exclusive of other items; "includes" means "comprises" not "consists of." "FAT" refers to FAT12, FAT16, FAT32, FAT32X, and their derivative file systems.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A sector-by-sector disk imaging and on-the-fly resizing method, comprising the steps of selecting user data in a source, reading file system structures from the source, choosing a target, determining a resizing relationship between the source and the target, and imaging data from the source to the target while resizing, the resizing being integrated with the imaging to reduce data movement.

2. The method of claim 1, wherein the source comprises a partition stored on a disk.

3. The method of claim 1, wherein the source comprises an image file.

4. The method of claim 1, wherein the target comprises an image file.

5. The method of claim 1, wherein the target comprises free space on a disk.

6. The method of claim 1, wherein the determining step determines that a cluster resizing operation performed on-the-fly on a copy of the source will reduce source user data storage requirements sufficiently to fit a copy of the selected source user data in the target.

7. The method of claim 1, wherein the imaging step comprises laying down a complete resized partition image on the target in a single pass.

8. The method of claim 1, further comprising the step of verifying the integrity and internal consistency of file system structures after an on-the-fly manipulation of the structures.

9. The method of claim 1, wherein the determining step determines that a partition resizing operation performed on-the-fly on a copy of the source will reduce source user data storage requirements sufficiently to fit a copy of the selected source user data in the target, and the resizing step comprises the partition resizing operation performed on-the-fly to reduce sector count.

10. The method of claim 9, wherein the resizing step comprises packing clusters on-the-fly.

11. The method of claim 9, wherein the resizing step comprises relocating at least one system sector on-the-fly.

12. The method of claim 9, wherein the resizing step comprises avoiding bad sectors.

13. A method for manipulating a partition on-the-fly while sector-by-sector imaging at least a portion of the partition, the method comprising the steps of:

copying sectors, other than a boot sector, which contain file system data of the partition from an image file into a computer memory;

performing at least one partition manipulation on the system data;

copying manipulated system data to a target; and copying selected user data from the image file to the target.

14. The method of claim 13, wherein the performing step comprises a resizing step which increases partition size.

15. The method of claim 13, wherein the performing step comprises a resizing step which decreases partition size.

16. The method of claim 13, wherein the performing step comprises a resizing step which increases cluster size.

17. The method of claim 13, wherein the performing step comprises a resizing step which decreases cluster size.

18. The method of claim 13, wherein the performing step comprises a resizing step which packs clusters.

19. The method of claim 13, wherein the performing step comprises a defragmenting step which defragments at least one file.

20. The method of claim 13, wherein the performing step comprises a relocating step which relocates at least one system sector.

21. The method of claim 13, further comprising the step of verifying the integrity and internal consistency of the system data after the performing step.

22. The method of claim 13, wherein the step of copying selected user data from the image file to the target requires at most one pass through the image file.

23. A computer system for manipulating a partition on-the-fly, the system comprising an interface for obtaining from a user a command which corresponds to at least one desired partition manipulation; at least one processor; and a memory configured by an on-the-fly means for performing the partition manipulation while sector-by-sector imaging the partition from a source to a target.

24. The system of claim 23, wherein the interface comprises a communications link for communication with a remote computer.

25. The system of claim 23, wherein the on-the-fly means comprises a means for converting file system format such that at least one partition in the target is organized according to a different file system than the corresponding partition in the source.

26. The system of claim 23, wherein the on-the-fly means comprises a first buffer and a second buffer for reading data sectors from the source, with the first buffer receiving both used and intervening unused sectors during continuous disk reads to reduce delay from disk rotation, and the second buffer receiving used sectors copied from the first buffer.

27. The system of claim 23, wherein the on-the-fly means comprises a means for making one pass to lay down both file system structures and user data on the target.

28. The system of claim 23, wherein the on-the-fly means comprises a means for making two passes through at least part of the target to lay down information on the target, including one pass to lay down file system structures and one pass to lay down user data sectors.

29. The system of claim 23, wherein the on-the-fly means comprises a means for making three passes through at least part of the target to lay down information on the target, including one pass to lay down user data sectors that can be copied straight across, one pass to lay down relocated user data sectors that are tucked into previously free space, and one pass to lay down file system structures.

30. The system of claim 23, wherein the on-the-fly means comprises a resizing means for resizing clusters in a file system.

31. The system of claim 30, wherein the resizing means comprises a means for resizing clusters in a FAT file system.

32. The system of claim 23, wherein the on-the-fly means comprises a relocating means for relocating system files in a file system.

33. The system of claim 32, wherein the relocating means comprises a means for relocating system files in an NTFS file system.

34. The system of claim 23, wherein the on-the-fly means comprises a means for imaging selected files such that the target omits at least one file that is present in the source.

35. The system of claim 34, wherein the means for imaging selected files comprises a means for merging file system structures obtained from two separate locations.

36. The system of claim 34, wherein the means for imaging selected files comprises a means for listing files to allow selection of files to be restored, a means for identifying the clusters present in each file selected to be restored, a means for ordering the clusters present in the selected files, and a means for making a single pass through part of an image file to copy the clusters from the image file to the target.

37. The system of claim 23, wherein the on-the-fly means comprises a means for reading an image file allocation map and using the allocation map to determine a limit on partition shrinkage in the absence of cluster packing and file relocation.

38. The system of claim 37, wherein the on-the-fly means further comprises a packing means for packing clusters in a file system by relocating user data clusters to produce a larger contiguous free space at one end of the partition and then updating the file system structures to preserve their integrity and internal consistency.

39. The system of claim 38, wherein the packing means comprises a means for packing clusters in a FAT file system.

40. The system of claim 38, wherein the packing means comprises a means for packing clusters in an NTFS file system.

41. A computer system for manipulating a partition on-the-fly, the system comprising:

at least one processor;

an interface for obtaining from a user a command which corresponds to restoring, from an image file stored on a storage medium to a target, at least one user file, the image file containing contents of user files stored in defragmented form; and a memory configured by an on-the-fly sector-by-sector imaging means for restoring at least one selected file by making at most one pass through the image file and at most two passes through the target.

* * * * *